(12) United States Patent
Ling et al.

(10) Patent No.: US 11,937,307 B2
(45) Date of Patent: *Mar. 19, 2024

(54) TRANSMISSION BEAM INDICATING

(71) Applicant: Motorola Mobility LLC, Chicago, IL (US)

(72) Inventors: Wei Ling, Beijing (CN); Chenxi Zhu, Beijing (CN)

(73) Assignee: Motorola Mobility LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/848,108

(22) Filed: Jun. 23, 2022

(65) Prior Publication Data

US 2022/0322451 A1 Oct. 6, 2022

Related U.S. Application Data

(63) Continuation of application No. 16/474,995, filed as application No. PCT/CN2016/112668 on Dec. 28, 2016, now Pat. No. 11,395,339.

(51) Int. Cl.
*H04W 74/08* (2009.01)
*H04B 7/06* (2006.01)
*H04W 72/044* (2023.01)

(52) U.S. Cl.
CPC ...... *H04W 74/0833* (2013.01); *H04B 7/0695* (2013.01); *H04W 72/046* (2013.01)

(58) Field of Classification Search
CPC ............ H04W 74/0833; H04W 74/046; H04B 7/0695; H04B 7/063
See application file for complete search history.

(56) References Cited

U.S. PATENT DOCUMENTS

| | | | |
|---|---|---|---|
| 2014/0010178 A1* | 1/2014 | Yu | H04B 7/0695 370/329 |
| 2014/0348051 A1* | 11/2014 | Park | H04W 74/0866 370/312 |
| 2016/0065286 A1 | 3/2016 | Kim et al. | |
| 2016/0157267 A1 | 6/2016 | Frenne et al. | |
| 2017/0367120 A1 | 12/2017 | Murray et al. | |
| 2018/0049141 A1 | 2/2018 | Choi et al. | |
| 2018/0343043 A1 | 11/2018 | Hakola et al. | |
| 2019/0104549 A1 | 4/2019 | Deng et al. | |
| 2019/0182786 A1 | 6/2019 | Wang et al. | |
| 2019/0253116 A1 | 8/2019 | Priyanto et al. | |
| 2019/0327764 A1* | 10/2019 | Yoo | H04L 1/18 |

FOREIGN PATENT DOCUMENTS

| | | |
|---|---|---|
| CN | 101674273 A | 3/2010 |
| CN | 103716081 A | 4/2014 |
| CN | 103918196 A | 7/2014 |
| CN | 104734758 A | 6/2015 |

* cited by examiner

*Primary Examiner* — Kan Yuen
(74) *Attorney, Agent, or Firm* — Kunzler Bean & Adamson

(57) ABSTRACT

Apparatuses, methods, and systems are disclosed for transmission beam indicating. One apparatus includes a transmitter that transmits information using multiple transmission beams. The apparatus also includes a receiver that receives a feedback message indicating a transmission beam of the multiple transmission beams. The feedback message is received in response to transmitting the information. The transmitter transmits a message using the transmission beam in response to receiving the feedback message.

20 Claims, 10 Drawing Sheets

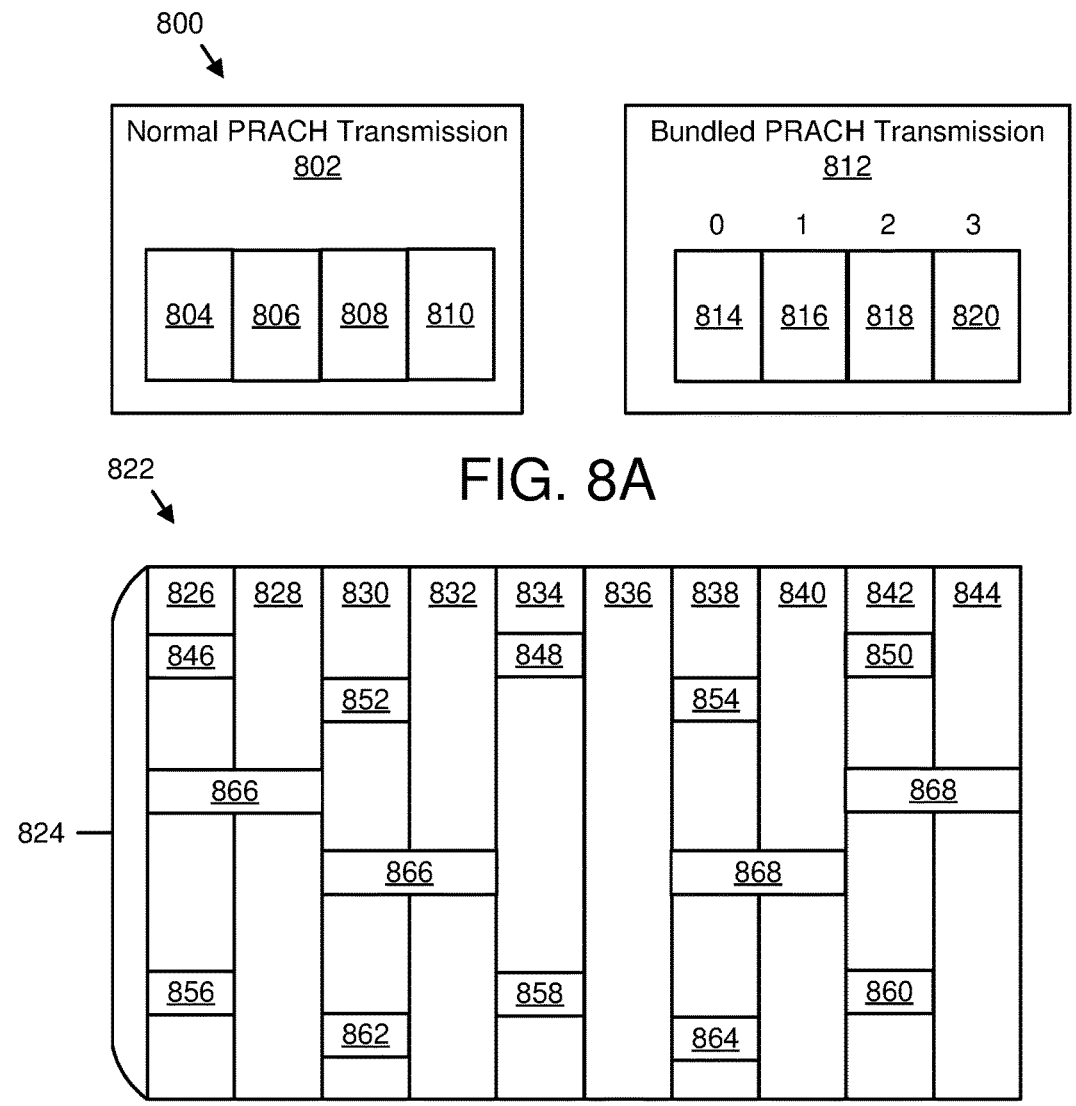
FIG. 8A
FIG. 8B
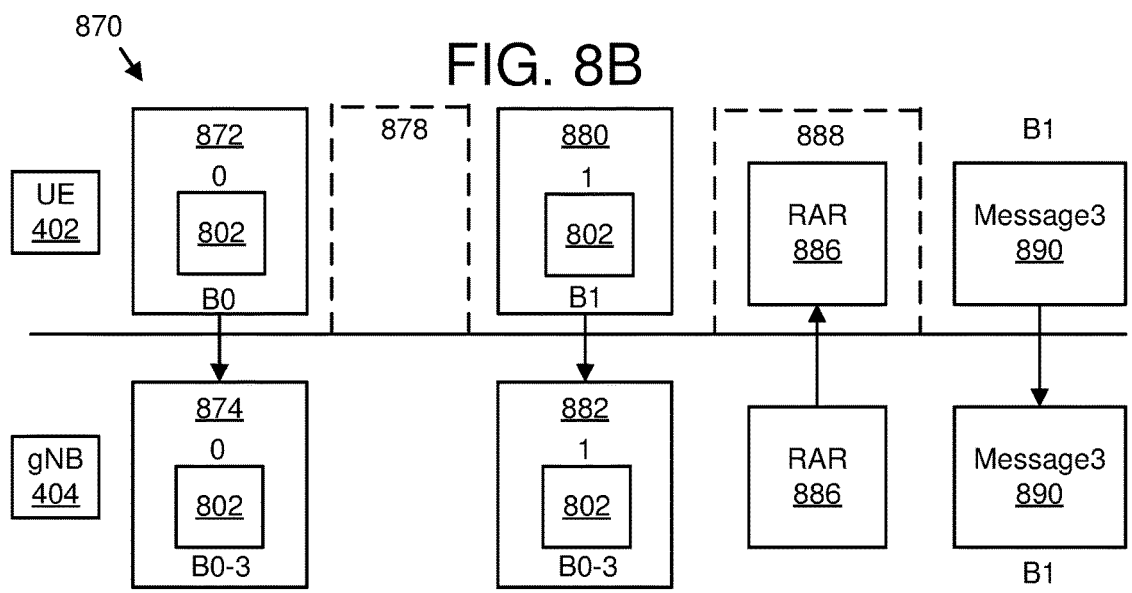
FIG. 8C

TRANSMISSION BEAM INDICATING

CROSS-REFERENCE TO RELATED APPLICATIONS

This application is a continuation of U.S. patent application Ser. No. 16/474,995 filed on Jun. 28, 2019, which claims priority to PCT Application PCT/CN2016/112668 filed on Dec. 28, 2016, all of which are incorporated herein by reference in their entirety.

FIELD

The subject matter disclosed herein relates generally to wireless communications and more particularly relates to transmission beam indicating.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Downlink Control Information ("DCI"), Downlink ("DL"), Downlink Pilot Time Slot ("DwPTS"), Enhanced Clear Channel Assessment ("eCCA"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, the propagation characteristics at higher frequencies (e.g. 6 GHz, 30 GHz, 70 GHz, and so forth) may be significantly different from lower frequency (e.g. 1.8 GHz, 2.6 GHz, and so forth) where the path loss is much higher. In such networks, multiple beams for all physical channels and/or signals including PRACH may be implemented to facilitate network coverage.

According to certain configurations, a normal RACH procedure includes a first message having PRACH preamble (e.g., message 1), a second message having a RAR (e.g., message 2), a third message having a message 3 (e.g., message 3), and fourth message having a message 4 (e.g., message 4).

In certain configurations, TX/RX reciprocity may be used in a multiple beam system because it determines whether beam sweeping is needed. In various configurations, TX/RX reciprocity may mean that there is a one to one mapping between a TX beam and a RX beam. For example, if a strongest TX beam of a base station for a UE in DL is TX beam1, then a strongest RX beam of the base station for the UE in UL is RX beam1. Each device like a base station and/or a UE may have its own TX/RX reciprocity. If a base station has TX/RX reciprocity, then its RX beam may be determined by TX beam of a UE or its TX beam may be determined by RX beam of a UE. Therefore, the base station doesn't need beam sweeping for transmission or reception once it knows a RX beam or a TX beam. But if a base station doesn't have TX/RX reciprocity, there is no association between a TX beam of a UE and a RX beam of the base station and/or a RX beam of a UE and a TX beam of the base station. Therefore, the base station may perform RX beam sweeping in reception or TX beam sweeping in transmission when it knows the TX beam to transmit or the RX beam to receive. Functionality of UEs with or without TX/RX reciprocity may be the same as the base station.

When a base station has TX/RX reciprocity, in which it doesn't need RX beam sweeping for receiving a PRACH preamble, the base station may configure one PRACH transmission occasion for a single PRACH preamble. When the base station does not have TX/RX reciprocity, in which it needs RX beam sweeping for receiving a PRACH preamble, the base station may configure a PRACH transmission occasion as M (M>1) PRACH preambles, where it may sweep its RX beam during the M preambles.

According to the above analysis, whether the RX beam sweeping of a base station during the receiving of a PRACH preamble is supported may be inferred by the number of the PRACH preambles within a PRACH transmission occasion in the broadcast system information. Therefore, M PRACH preambles in one PRACH transmission occasion may be configured by the base station according to its TX/RX reciprocity and the number of RX beams on which beam sweeping is performed during UL reception. The configuration of time-frequency resources and preamble of PRACH transmission occasions may be signaled to UEs by broadcast system information. A UE may select a PRACH transmission occasion randomly to transmit a PRACH, and may wait for a RAR in a RAR window. The UE may start retransmission when it doesn't receive a RAR in the RAR window.

A UE may perform TX beam sweeping in the transmission of PRACH for successful initial access when it doesn't have TX/RX reciprocity. However, it may not be able to perform TX beam sweeping in one PRACH transmission occasion. Therefore, it may only perform TX beam sweeping after a PRACH transmission occasion and when the corresponding RAR message is missing. Accordingly, the latency for UL initial access may be large for UEs without TX/RX reciprocity, especially if the number of TX beams of UEs is large.

Moreover, a TX beam may not be an optimal TX beam if a base station transmits a RAR once it detects a PRACH successfully because a UE may not finish a TX beam sweeping by the time it receives a RAR. Accordingly, the performance of a message 3 may be degraded if the UE uses suboptimal TX beams in the transmission of message 3.

BRIEF SUMMARY

Apparatuses for transmission beam indicating are disclosed. Methods and systems also perform the functions of the apparatus. In one embodiment, the apparatus includes a transmitter that transmits information using multiple transmission beams. The apparatus also includes a receiver that receives a feedback message indicating a transmission beam of the multiple transmission beams. In certain embodiments, the feedback message is received in response to transmitting the information. In some embodiments, the transmitter transmits a message using the transmission beam in response to receiving the feedback message.

In one embodiment, the information includes one or more physical random access channel preambles. In a further embodiment, the receiver receives a resource pool for transmitting the information. In certain embodiments, the transmitter transmits the information using a selected one or more resources of the resource pool. In some embodiments, the resource pool includes resources for bundled physical random access channel transmissions.

In various embodiments, the resource pool includes a first resource pool having a first set of resources for normal physical random access channel transmissions and a second resource pool having a second set of resources for bundled physical random access channel transmissions. In some embodiments, the bundled physical random access channel transmissions each include multiple normal physical random access channel transmissions. In one embodiment, the feedback message includes a random access response. In a further embodiment, the feedback message includes an indication that indicates the transmission beam. In various embodiments, the message includes a message 3 of a random access channel procedure.

In some embodiments, the feedback message is generated by a base unit in response to: the base unit detecting one or more normal physical random access channel transmissions in a bundled physical random access channel transmission; and the base unit determining a strongest transmission of the one or more normal physical random access channel transmissions. In one embodiment, the feedback message includes an index corresponding to the strongest transmission of the one or more normal physical random access channel transmissions. In a further embodiment, the index corresponding to the strongest transmission of the one or more normal physical random access channel transmissions is associated with an index corresponding to the transmission beam.

A method for transmission beam indicating, in one embodiment, includes transmitting information using multiple transmission beams. The method also includes receiving a feedback message indicating a transmission beam of the multiple transmission beams. In certain embodiments, the feedback message is received in response to transmitting the information. The method includes transmitting a message using the transmission beam in response to receiving the feedback message.

In one embodiment, an apparatus includes a receiver that receives information transmitted using multiple transmission beams. The apparatus also includes a transmitter that transmits a feedback message indicating a transmission beam of the multiple transmission beams. In certain embodiments, the feedback message is transmitted in response to receiving the information. In various embodiments, the receiver receives a message transmitted using the transmission beam in response to transmitting the feedback message.

In one embodiment, the information includes one or more physical random access channel preambles. In a further embodiment, the transmitter transmits a resource pool for communicating the information. In certain embodiments, the receiver receives the information using a selected one or more resources of the resource pool. In some embodiments, the resource pool includes resources for bundled physical random access channel transmissions.

In various embodiments, the resource pool includes a first resource pool having a first set of resources for normal physical random access channel transmissions and a second resource pool having a second set of resources for bundled physical random access channel transmissions. In some embodiments, the bundled physical random access channel transmissions each include multiple normal physical random access channel transmissions. In one embodiment, the feedback message includes a random access response. In a further embodiment, the feedback message includes an indication that indicates the transmission beam. In various embodiments, the message includes a message 3 of a random access channel procedure.

In some embodiments, the feedback message is generated by a processor in response to: the apparatus detecting one or more normal physical random access channel transmissions in a bundled physical random access channel transmission; and the apparatus determining a strongest transmission of the one or more normal physical random access channel transmissions. In one embodiment, the feedback message includes an index corresponding to the strongest transmission of the one or more normal physical random access channel transmissions. In a further embodiment, the index corresponding to the strongest transmission of the one or more normal physical random access channel transmissions is associated with an index corresponding to the transmission beam.

A method for transmission beam indicating, in one embodiment, includes receiving information transmitted using multiple transmission beams. The method also includes transmitting a feedback message indicating a transmission beam of the multiple transmission beams. In certain embodiments, the feedback message is transmitted in response to receiving the information. The method includes receiving a message transmitted using the transmission beam in response to transmitting the feedback message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8A is a schematic block diagram illustrating an additional embodiment of resource bundling for transmission beam indicating;

FIG. 8B is a schematic block diagram illustrating an additional embodiment of resource pools for transmission beam indicating;

FIG. 8C is a schematic block diagram illustrating an additional embodiment of communications for transmission beam indicating;

DETAILED DESCRIPTION

Figure 1:
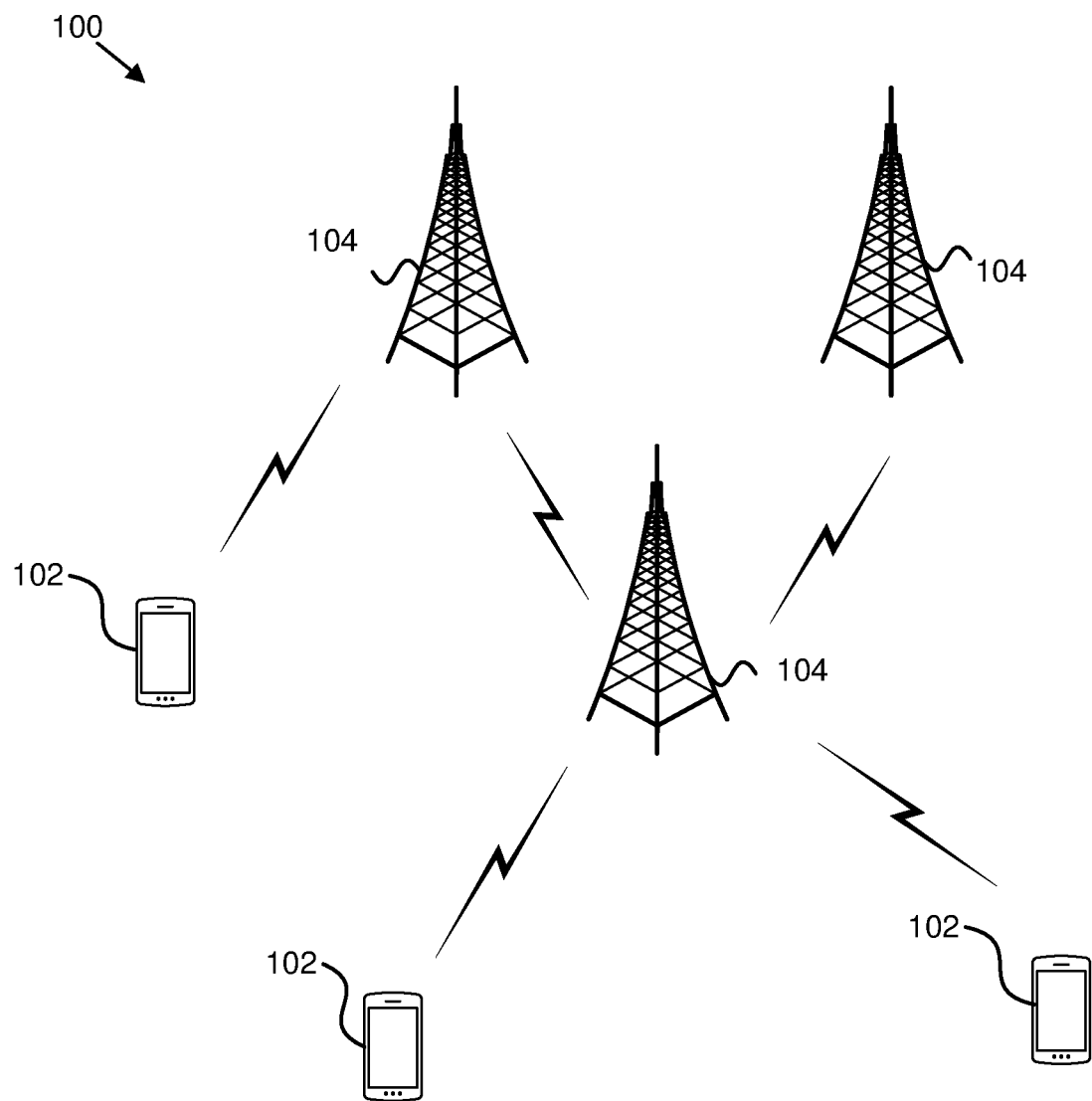
FIG. 1 is a schematic block diagram illustrating one embodiment of a wireless communication system for transmission beam indicating.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmission beam indicating. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may receive information transmitted using multiple transmission beams. The base unit 104 may also transmits a feedback message indicating a transmission beam of the multiple transmission beams. In certain embodiments, the feedback message may be transmitted in response to receiving the information. In some embodiments, the base unit 104 may receive a message transmitted using the transmission beam in response to transmitting the feedback message. Accordingly, a base unit 104 may be used for transmission beam indicating.

In another embodiment, a remote unit 102 may transmit information using multiple transmission beams. The remote unit 102 may receive a feedback message indicating a transmission beam of the multiple transmission beams. In certain embodiments, the feedback message may be received in response to transmitting the information. The remote unit 102 may transmit a message using the transmission beam in response to receiving the feedback message.

Figure 2:
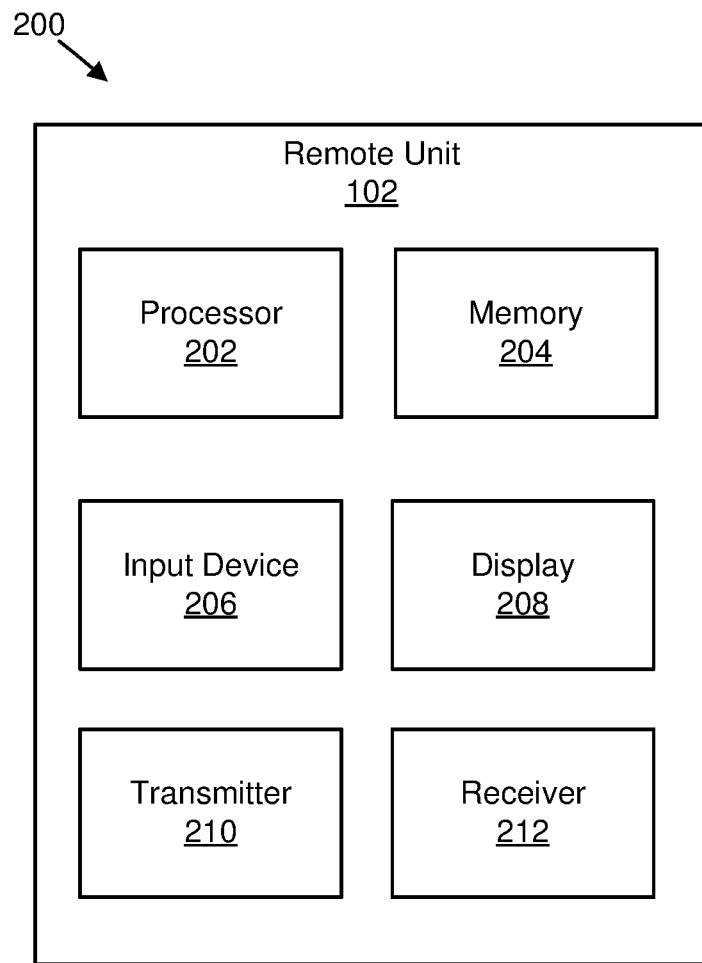
FIG. 2 is a schematic block diagram illustrating one embodiment of an apparatus that may be used for transmission beam indicating.

FIG. 2 depicts one embodiment of an apparatus 200 that may be used for transmission beam indicating. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to resource pools. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit information using multiple transmission beams. In certain embodiments, the transmitter 210 is used to transmit a message using a transmission beam in response to receiving a feedback message. In one embodiment, the receiver 212 may be used to receive a feedback message indicating a transmission beam of multiple transmission beams. In such an embodiment, the feedback message may be received in response to transmitting the information. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
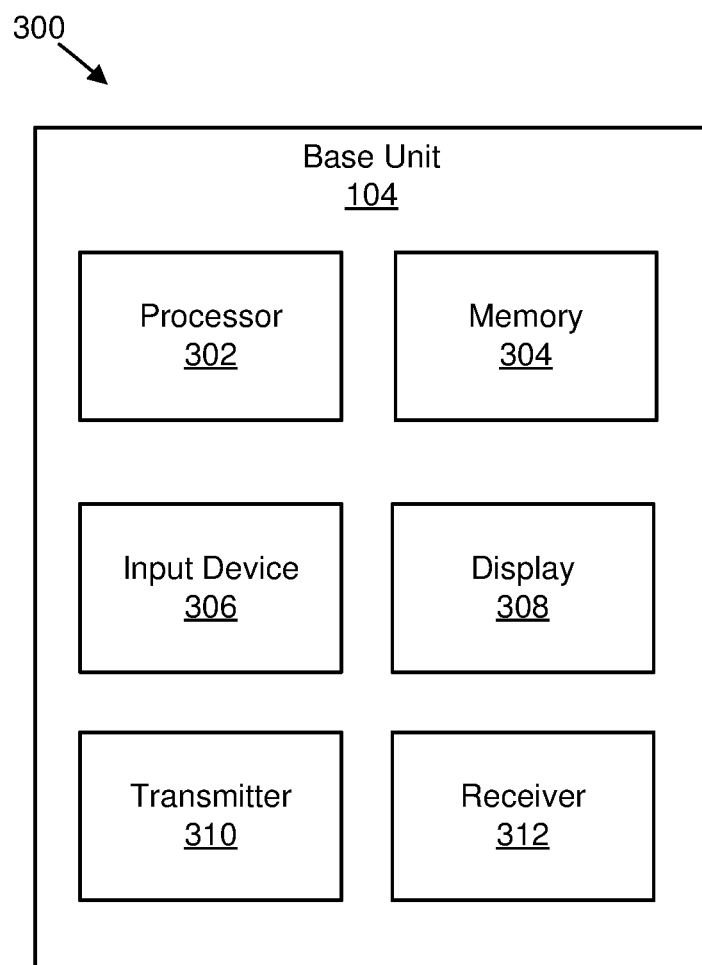
FIG. 3 is a schematic block diagram illustrating one embodiment of an apparatus that may be used for transmission beam indicating.

FIG. 3 depicts one embodiment of an apparatus 300 that may be used for transmission beam indicating. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiment, the transmitter 310 is used to transmit a feedback message indicating a transmission beam of multiple transmission beams. In such embodiments, the feedback message may be transmitted in response to receiving information. In certain embodiments, the receiver 312 may be used to receive information transmitted using multiple transmission beams. In various embodiments, the receiver 312 may be used to receive a message transmitted using a transmission beam in response to transmitting a feedback message. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
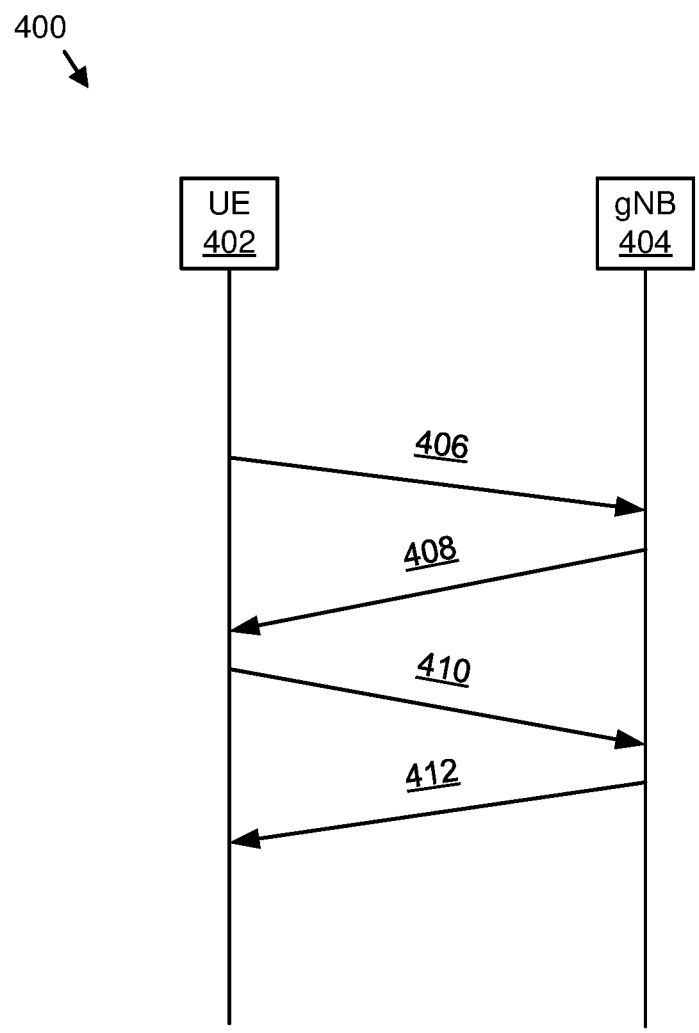
FIG. 4 illustrates one embodiment of communications for transmission beam indicating.

FIG. 4 illustrates one embodiment of communications 400 for transmission beam indicating. Specifically, communications 400 between a UE 402 and a gNB 404 are illustrated. A first communication 406 may include a message including one or more PRACH preambles transmitted from the UE 402 and received by the gNB 404. A second communication 408 may include a RAR transmitted from the gNB 404 to the UE 402. A third communication 410 may include a message 3 transmitted from the UE 402 to the gNB 404. A fourth communication 412 may include a message 4 transmitted from the gNB 404 to the UE 402.

In one embodiment, a resource pool of normal PRACH transmission occasions and/or a resource pool of bundled PRACH transmission occasions may be used for transmitting the one or more PRACH preambles in the first communication 406. The resource pool of normal PRACH transmission occasions may be used for transmitting M (M>=1) PRACH preambles. Moreover, the resource pool of normal PRACH transmission occasions may be determined by a TX/RX reciprocity of the gNB 404. Furthermore, a RX beam number of the gNB 404 may be determined by the gNB 404. In addition, the resource pool of bundled PRACH transmission occasions may include N (N>1) normal PRACH transmission occasions for transmitting M PRACH preambles. The resource pool of bundled PRACH transmission occasions may be determined by the gNB 404. In certain embodiments, the resource pool of normal PRACH transmission occasions and the resource pool of bundled PRACH transmission occasions do not overlap.

As used herein, "resource pool" may refer to a group of one or more resources, a resource allocation, an allocation of one or more resources, a resource pool allocation, or the like.

In various embodiments, the gNB 404 may signal a configuration of a resource pool of normal PRACH transmission occasions and/or a resource pool of bundled PRACH transmission occasions to UEs by using broadcast system information.

The UE 402 may obtain the configuration of the resource pool of normal PRACH transmission occasions and/or the resource pool of bundled PRACH transmission occasions after it synchronizes with the gNB 404 and decodes the broadcast system information. When the UE 402 determines to transmit PRACH to synchronize with the gNB 404 in UL, the UE 402 may use various methods to determine a resource for the PRACH transmission.

In one embodiment in which the UE 402 doesn't have TX/RX reciprocity, a number (L) of TX beams of the UE 402 may be smaller than N (e.g., the bundling size). The UE 402 may choose a normal PRACH transmission occasion from the resource pool of normal PRACH transmission occasions for PRACH transmission, or the UE 402 may choose a bundled PRACH transmission occasion from the resource pool of bundled PRACH transmission occasions for PRACH transmission according to its requirement of latency of initial UL access. Because L is smaller than N, there are N-L normal PRACH transmission occasions remaining after an entire TX beam sweeping using a bundled PRACH transmission occasion. A predetermined UE implementation may be used to determine what to do with the remaining N-L normal PRACH transmission occasions. For example, in one embodiment, there may be no transmissions in the remaining N-L normal PRACH transmission occasions to facilitate power saving. As another example, in certain embodiments, there may be repetitive TX beam transmissions in the remaining N-L normal PRACH transmission occasions to faciliate reliability.

In another embodiment in which the UE 402 doesn't have TX/RX reciprocity, the number (L) of TX beam of the UE 402 may not be smaller than N. Accordingly, the UE 402 may sweep ⌈L/N⌉ times (e.g., rounded up to the nearest whole number) by using ⌈L/N⌉ bundled PRACH transmission occasions (e.g., rounded up to the nearest whole number) at most for an entire TX beam sweeping. If the number of TX beams to sweep is smaller than N in a particular sweeping time of the ⌈L/N⌉ times, then the UE 402 may perform sweeping similar to the embodiment described in which L is smaller than N. Otherwise, the UE 402 may perform the following. First, the UE 402 may choose a bundled PRACH transmission occasion from the resource pool of bundled PRACH transmission occasions by using N different TX beams in the N normal PRACH transmission occasions, and wait for a corresponding RAR in a RAR window. If the UE 402 receives a corresponding RAR, then the UE 402 may know the best TX beam out of N TX beams used to transmit the corresponding PRACH by decoding a PRACH occasion index included in the RAR. The UE 402 may use this TX beam to transmit message 3. If the UE 402 doesn't receive a corresponding RAR, then the UE 402 may choose another bundled PRACH transmission occasion from the resource pool of bundled PRACH transmission occasions for PRACH transmission by using another N different TX beams.

If the UE 402 has TX/RX reciprocity and if the resource pool of bundled PRACH transmission occasions is available for the UEs with TX/RX reciprocity (e.g., this may be configured by the base station), then the UE 402 may perform sweeping similar to the embodiment described in which L is smaller than N. If the resource pool of bundled PRACH transmission occasions is unavailable for the UEs with TX/RX reciprocity (e.g., this may be configured by the base station), then the UE 402 may choose a normal PRACH transmission occasion from the resource pool of normal PRACH transmission occasions to transmit PRACH.

The gNB 404 detects PRACH on resources configured for PRACH transmission. If the resource is part of the resource pool of normal PRACH transmission occasions, the gNB 404 transmits a RAR if it detects a PRACH transmission on this resource. If the resource is part of a resource pool of bundled PRACH transmission occasions, the gNB 404 transmits a RAR when it at least detects a PRACH transmission as part of the bundled PRACH transmission occasion after it detects all the normal PRACH transmission occasions in the bundled PRACH transmission occasion. In the corresponding RAR, the gNB 404 includes an index of the strongest received PRACH transmission occasion implicitly or explicitly. For example, the index may be included in the RA-CNTI or may be included in the payload of RAR.

Figure 5A:
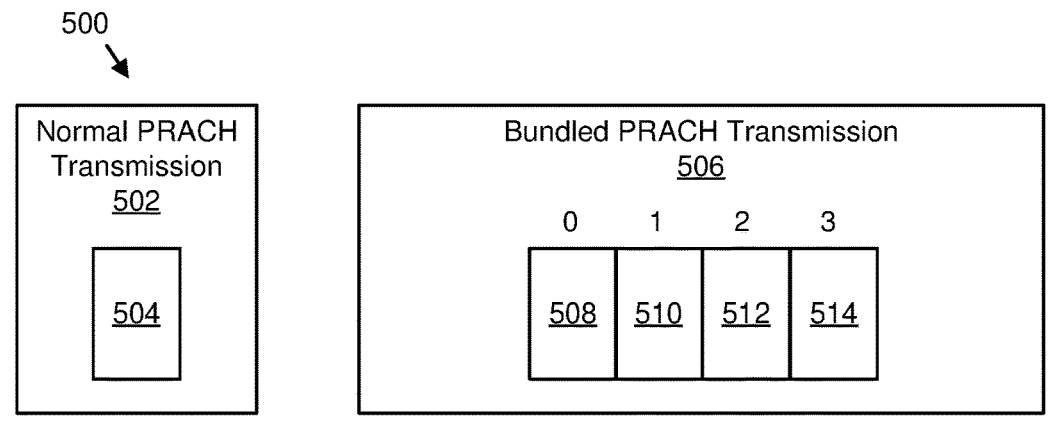
FIG. 5A is a schematic block diagram illustrating one embodiment of resource bundling for transmission beam indicating.

FIG. 5A is a schematic block diagram illustrating one embodiment of resource bundling 500 for transmission beam indicating. In this embodiment, the gNB 404 has TX/RX reciprocity. Moreover, a normal PRACH transmission 502 occasion includes one (e.g., M=1) PRACH preamble 504. The bundled size of a bundled PRACH transmission 506 occasion (e.g., N) is 4. Specifically, the bundled PRACH transmission 506 includes a first normal PRACH transmission 508 having an index of 0, a second normal PRACH transmission 510 having an index of 1, a third normal PRACH transmission 512 having an index of 2, and a fourth normal PRACH transmission 514 having an index of 3.

Figure 5B:
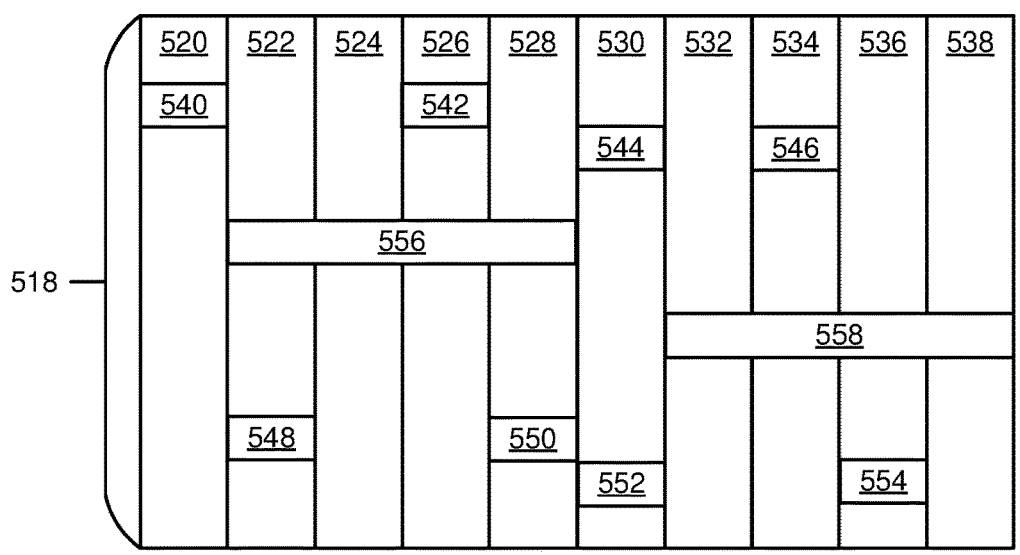
FIG. 5B is a schematic block diagram illustrating one embodiment of resource pools for transmission beam indicating.

FIG. 5B is a schematic block diagram illustrating one embodiment of resource pools for transmission beam indicating. A 10 ms frame 516 is illustrated having a system bandwidth 518. The frame 516 includes 1 ms subframes 520, 522, 524, 526, 528, 530, 532, 534, 536, and 538. The frame 516 includes a resource pool of normal PRACH transmission resource occasions 540, 542, 544, 546, 548, 550, 552, and 554, and a resource pool of bundled PRACH transmission resource occasions 556 and 558.

Figure 5C:
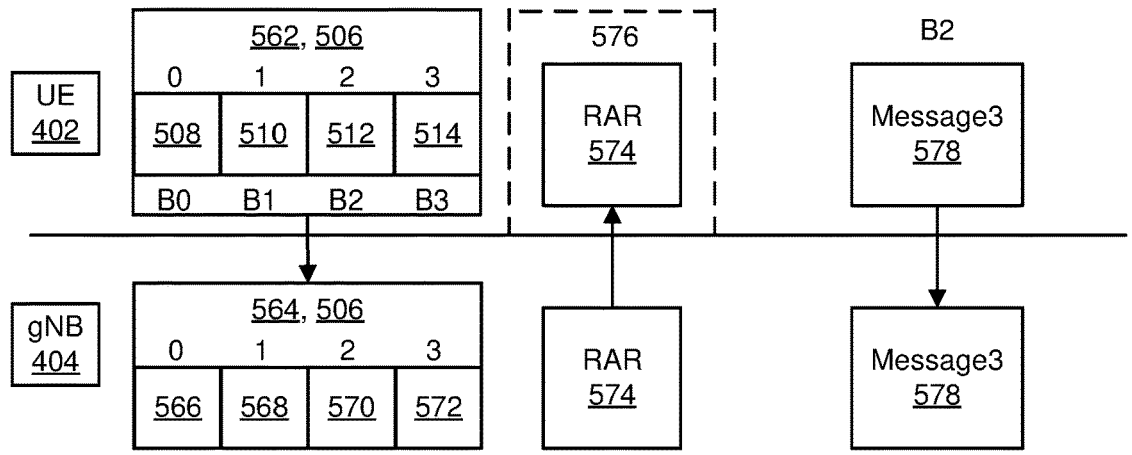
FIG. 5C is a schematic block diagram illustrating one embodiment of communications for transmission beam indicating.

FIG. 5C is a schematic block diagram illustrating one embodiment of communications 560 for transmission beam indicating. In this embodiment, the UE 402 does not have TX/RX reciprocity. Moreover, the UE 402 has 4 TX beams (e.g., B0, B1, B2, B3) in UL which the UE 402 may use to transmit PRACH preambles to initialize UL access. The UE 402 may obtain a configuration of a resource pool of normal PRACH transmission occasions and a resource pool of bundled PRACH transmission occasions after decoding broadcast system information.

In this embodiment, the number of TX beams of the UE 402 is equal to the bundled size of the bundled PRACH transmission 506 occasion. Therefore, the UE 402 may select a bundled PRACH transmission occasion from the resource pool of bundled PRACH transmission occasions. The UE 402 transmits a bundled PRACH transmission 562 in which a PRACH preamble is transmitted on the first normal PRACH transmission 508 using TX beam B0, the second normal PRACH transmission 510 using TX beam B1, the third normal PRACH transmission 512 using TX beam B2, and the fourth normal PRACH transmission 514 using TX beam B3. Thus, the PRACH preambles are transmitted 4 times in the bundled PRACH transmission 562 occasion by using 4 different TX beams with 1 TX beam in each normal PRACH transmission occasion.

The gNB 404 may detect two PRACH transmissions successfully of a received bundled PRACH transmission 564 that includes a first normal PRACH transmission 566, a second normal PRACH transmission 568, a third normal PRACH transmission 570, and a fourth normal PRACH transmission 572. Specifically, the gNB 404 may successfully detect the first normal PRACH transmission 566 occasion having an index of 0 in the bundled PRACH transmission 564, and the third normal PRACH transmission 570 occasion having an index of 2 in the bundled PRACH transmission 564 out of these 4 normal PRACH transmission occasions. The strongest detected PRACH may be the third normal PRACH transmission 570 occasion having the index of 2 in the bundled PRACH transmission 564. The gNB 404 may transmit a RAR 574 that includes the index of the strongest detected PRACH transmission occasion (e.g., 2) to indicate to the UE 402 that TX B2 is the best TX beam out of the 4 TX beams. The UE 402 may detect the RAR 574 in a RAR window 576 and determine from the index indication that the TX B2 is the best TX beam to transmit in UL. Therefore, the UE 402 may use TX B2 to transmit message3 578 to the gNB 404.

Figure 6A:
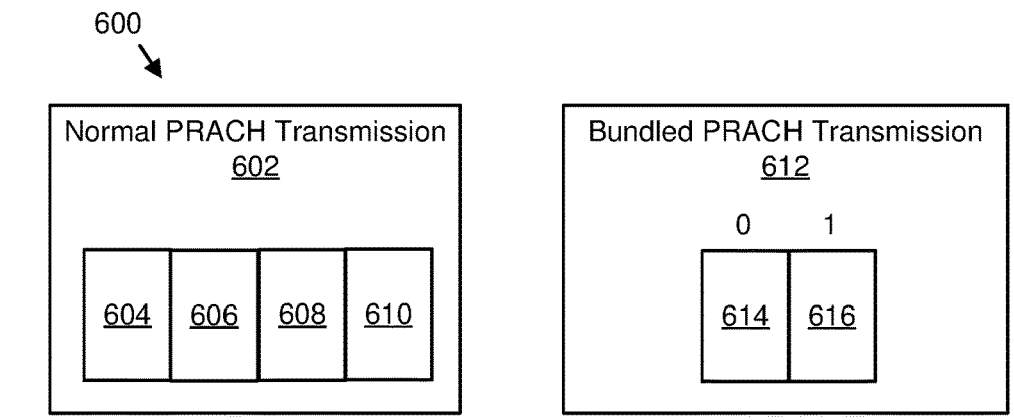
FIG. 6A is a schematic block diagram illustrating another embodiment of resource bundling for transmission beam indicating.

FIG. 6A is a schematic block diagram illustrating another embodiment of resource bundling 600 for transmission beam indicating. In this embodiment, the gNB 404 does not have TX/RX reciprocity. A number of RX beams in UL of the gNB 404 is 4 (e.g., B0, B1, B2, B3). Moreover, a normal PRACH transmission 602 occasion includes four (e.g., M=4) PRACH preambles: a first PRACH preamble 604, a second PRACH preamble 606, a third PRACH preamble 608, and a fourth PRACH preamble 610. The bundled size of a bundled PRACH transmission 612 occasion (e.g., N) is 2. Specifically, the bundled PRACH transmission 612 includes a first normal PRACH transmission 614 having an index of 0 and a second normal PRACH transmission 616 having an index of 1.

Figure 6B:
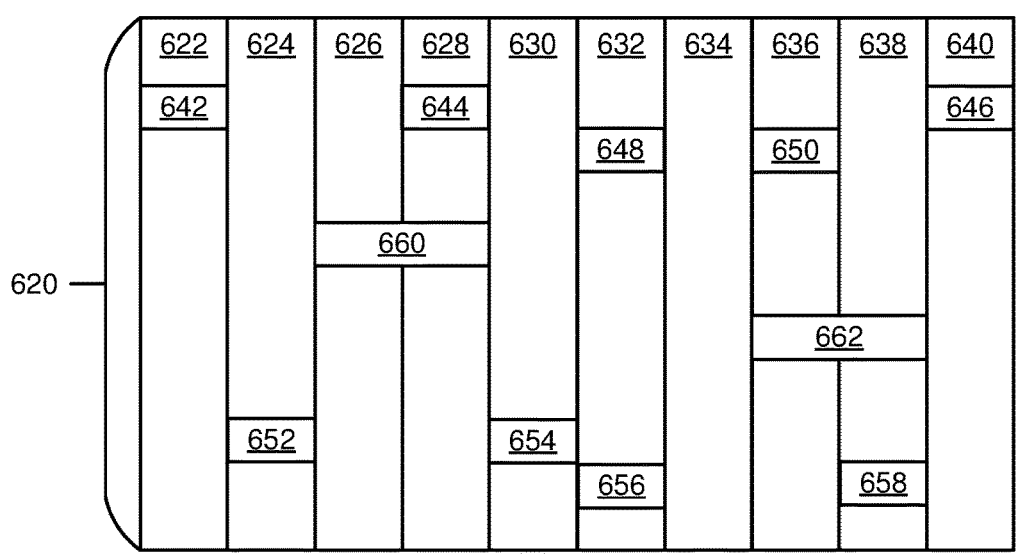
FIG. 6B is a schematic block diagram illustrating another embodiment of resource pools for transmission beam indicating.

FIG. 6B is a schematic block diagram illustrating one embodiment of resource pools for transmission beam indicating. A 10 ms frame 618 is illustrated having a system bandwidth 620. The frame 618 includes 1 ms subframes 622, 624, 626, 628, 630, 632, 634, 636, 638, and 640. The frame 618 includes a resource pool of normal PRACH transmission resource occasions 642, 644, 646, 648, 650, 652, 654, 656, and 658, and a resource pool of bundled PRACH transmission resource occasions 660 and 662.

Figure 6C:
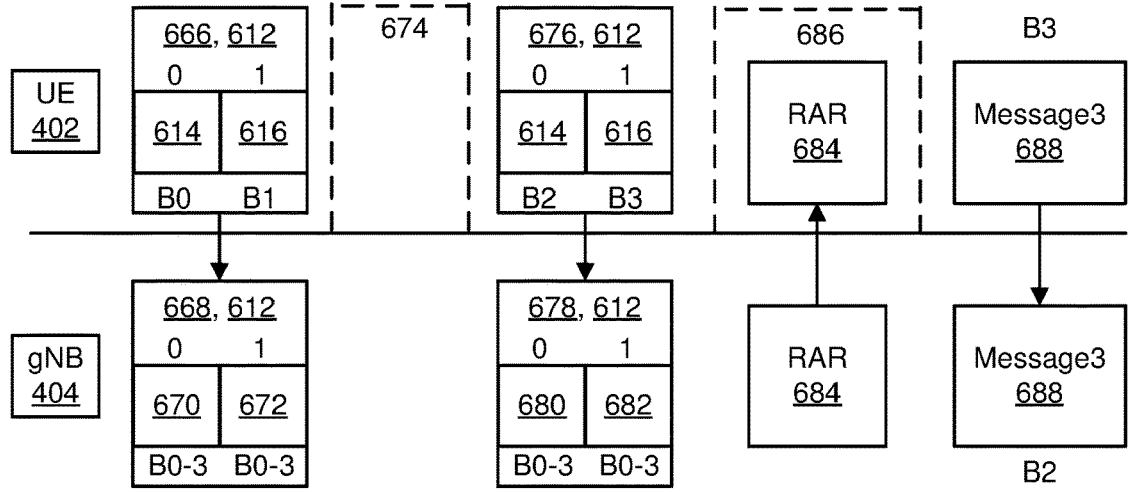
FIG. 6C is a schematic block diagram illustrating another embodiment of communications for transmission beam indicating.

FIG. 6C is a schematic block diagram illustrating another embodiment of communications 664 for transmission beam indicating. In this embodiment, the UE 402 does not have TX/RX reciprocity. Moreover, the UE 402 has 4 TX beams (e.g., B0, B1, B2, B3) in UL which the UE 402 may use to transmit PRACH preambles to initialize UL access. The UE 402 may obtain a configuration of a resource pool of normal PRACH transmission occasions and a resource pool of bundled PRACH transmission occasions after decoding broadcast system information.

In this embodiment, the number of TX beams of the UE 402 is larger than the bundled size of the bundled PRACH transmission 612 occasion. Therefore, the UE 402 may select a bundled PRACH transmission occasion from the resource pool of bundled PRACH transmission occasions. The UE 402 transmits a bundled PRACH transmission 666 in which a PRACH preamble is transmitted on the first normal PRACH transmission 614 using TX beam B0 and the second normal PRACH transmission 616 using TX beam B1. Thus, the PRACH preambles are transmitted 2 times in the bundled PRACH transmission occasion 666 by using 2 different TX beams with 1 TX beam in each normal PRACH transmission occasion.

The gNB 404 may receive a bundled PRACH transmission 668 including a first normal PRACH transmission 670 and a second normal PRACH transmission 672 and perform a RX beam sweeping in each of the normal PRACH transmission occasions to detect PRACH preambles, but the gNB 404 may not detect any PRACH preambles in the bundled PRACH transmission 668 occasion (e.g., because of bad link budget of the 2 UE 402 TX beams).

After the UE 402 does not receive a corresponding RAR in an RAR window 674, the UE 402 may select another bundled PRACH transmission occasion from the resource pool of bundled PRACH transmission occasions. The UE 402 transmits a bundled PRACH transmission 676 in which a PRACH preamble is transmitted on the first normal PRACH transmission 614 using TX beam B2 and the second normal PRACH transmission 616 using TX beam B3. Thus, the PRACH preambles are transmitted 2 times in the bundled PRACH transmission occasion 676 by using 2 different TX beams with 1 TX beam in each normal PRACH transmission occasion.

The gNB 404 may detect two PRACH transmissions successfully of a received bundled PRACH transmission 678 that includes a first normal PRACH transmission 680 and a second normal PRACH transmission 682. Specifically, the gNB 404 may successfully detect, by doing RX beam sweeping, a third PRACH preamble of the first normal PRACH transmission 680 occasion using RX beam B2 having an index of 0 in the bundled PRACH transmission 678 and a third PRACH preamble of the second normal PRACH transmission 682 occasion using RX beam B2 having an index of 1 in the bundled PRACH transmission 678. The strongest detected PRACH may be the second normal PRACH transmission 682 occasion having the index of 1 in the bundled PRACH transmission 678. The gNB 404 may transmit a RAR 684 that includes the index of the strongest detected PRACH transmission occasion (e.g., 1) to indicate to the UE 402 that TX B3 is the best TX beam out of the 4 TX beams. The UE 402 may detect the RAR 684 in a RAR window 686 and determine from the index indication that the TX B3 is the best TX beam to transmit in UL. Therefore, the UE 402 may use TX B3 to transmit message3 688 to the gNB 404. The gNB 404 may receive the message3 688 using RX B2 which is the beam on which the gNB 404 received the PRACH preambles properly.

Figure 7A:
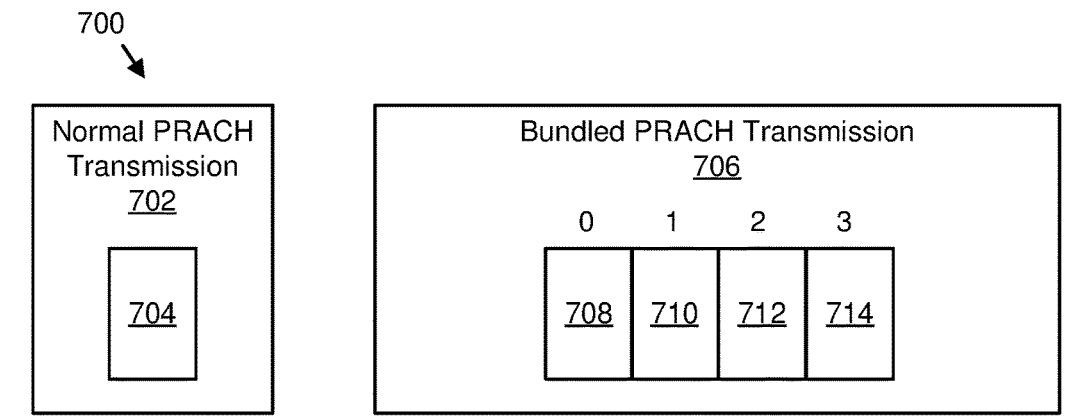
FIG. 7A is a schematic block diagram illustrating a further embodiment of resource bundling for transmission beam indicating.

FIG. 7A is a schematic block diagram illustrating a further embodiment of resource bundling 700 for transmission beam indicating. In this embodiment, the gNB 404 has TX/RX reciprocity. Moreover, a normal PRACH transmission 702 occasion includes one (e.g., M=1) PRACH preamble 704. The bundled size of a bundled PRACH transmission 706 occasion (e.g., N) is 4. Specifically, the bundled PRACH transmission 706 includes a first normal PRACH transmission 708 having an index of 0, a second normal PRACH transmission 710 having an index of 1, a third normal PRACH transmission 712 having an index of 2, and a fourth normal PRACH transmission 714 having an index of 3.

Figure 7B:
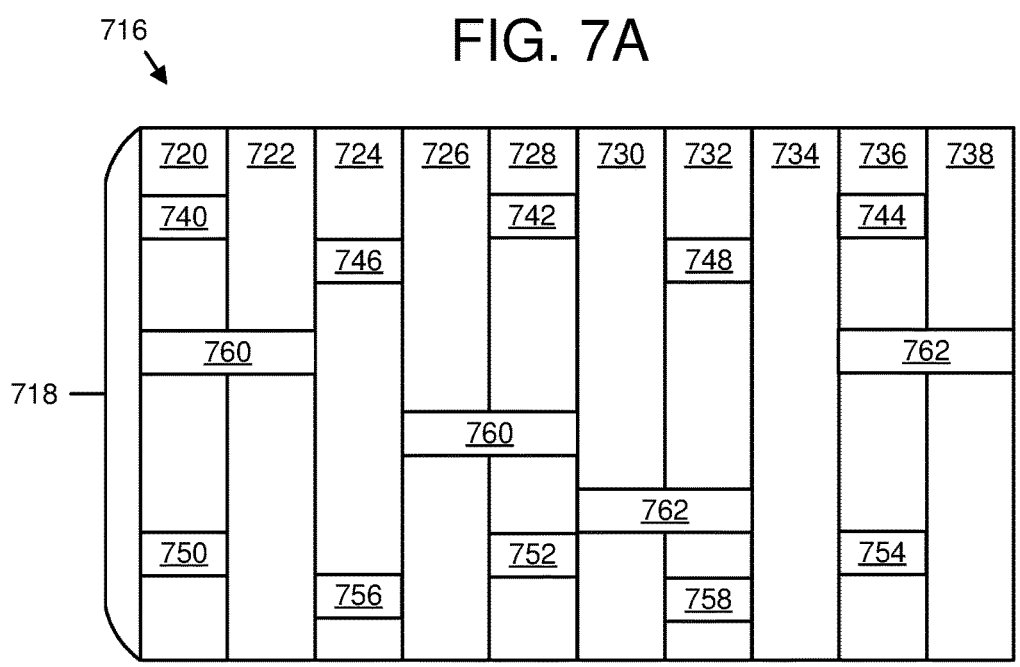
FIG. 7B is a schematic block diagram illustrating a further embodiment of resource pools for transmission beam indicating.

FIG. 7B is a schematic block diagram illustrating a further embodiment of resource pools for transmission beam indicating. A 10 ms frame 716 is illustrated having a system bandwidth 718. The frame 716 includes 1 ms subframes 720, 722, 724, 726, 728, 730, 732, 734, 736, and 738. The frame 716 includes a resource pool of normal PRACH transmission resource occasions 740, 742, 744, 746, 748, 750, 752, 754, 756, and 758, and a resource pool of bundled PRACH transmission resource occasions 760 and 762.

Figure 7C:
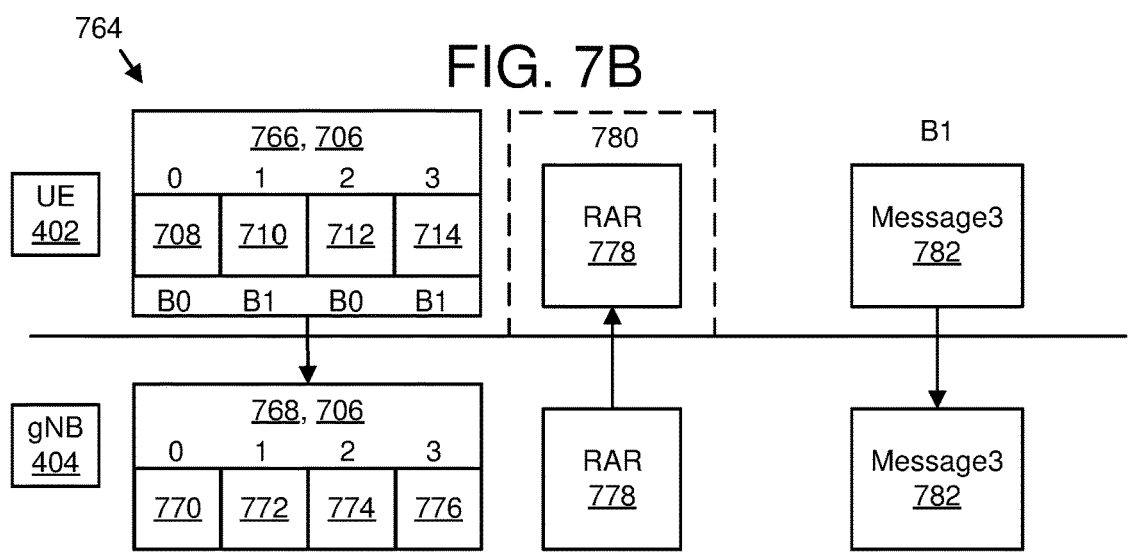
FIG. 7C is a schematic block diagram illustrating a further embodiment of communications for transmission beam indicating.

FIG. 7C is a schematic block diagram illustrating a further embodiment of communications 764 for transmission beam indicating. In this embodiment, the UE 402 does not have TX/RX reciprocity. Moreover, the UE 402 has 2 TX beams (e.g., B0, B1) in UL which the UE 402 may use to transmit PRACH preambles to initialize UL access. The UE 402 may obtain a configuration of a resource pool of normal PRACH transmission occasions and a resource pool of bundled PRACH transmission occasions after decoding broadcast system information.

In this embodiment, the number of TX beams of the UE 402 is less than the bundled size of the bundled PRACH transmission 706 occasion. Therefore, the UE 402 may select a bundled PRACH transmission occasion from the resource pool of bundled PRACH transmission occasions. The UE 402 transmits a bundled PRACH transmission 766 in which a PRACH preamble is transmitted on the first normal PRACH transmission 708 using TX beam B0, the second normal PRACH transmission 710 using TX beam B1, the third normal PRACH transmission 712 using TX beam B0, and the fourth normal PRACH transmission 714 using TX beam B1. Thus, the PRACH preambles are transmitted 4 times in the bundled PRACH transmission 766 occasion by using 2 different TX beams with 1 TX beam in each normal PRACH transmission occasion repeated twice during the bundled PRACH transmission 766.

The gNB 404 may detect three PRACH transmissions successfully of a received bundled PRACH transmission 768 that includes a first normal PRACH transmission 770, a second normal PRACH transmission 772, a third normal PRACH transmission 774, and a fourth normal PRACH transmission 776. Specifically, the gNB 404 may successfully detect the second normal PRACH transmission 772 occasion having an index of 1 in the bundled PRACH transmission 768, the third normal PRACH transmission 774 occasion having an index of 2 in the bundled PRACH transmission 768, and the fourth normal PRACH transmission 776 occasion having an index of 3 in the bundled PRACH transmission 768 out of these 4 normal PRACH transmission occasions. The strongest detected PRACH may be the fourth normal PRACH transmission 776 occasion having the index of 3 in the bundled PRACH transmission 768.

The gNB 404 may transmit a RAR 778 that includes the index of the strongest detected PRACH transmission occasion (e.g., 3) to indicate to the UE 402 that TX B1 is the best TX beam out of the 2 TX beams. The UE 402 may detect the RAR 778 in a RAR window 780 and determine from the index indication that the TX B1 is the best TX beam to transmit in UL. Therefore, the UE 402 may use TX B1 to transmit message3 782 to the gNB 404.

FIG. 8A is a schematic block diagram illustrating an additional embodiment of resource bundling 800 for transmission beam indicating. In this embodiment, the gNB 404 does not have TX/RX reciprocity. A number of RX beams in UL of the gNB 404 is 4 (e.g., B0, B1, B2, B3). Moreover, a normal PRACH transmission 802 occasion includes four (e.g., M=4) PRACH preambles: a first PRACH preamble 804, a second PRACH preamble 806, a third PRACH preamble 808, and a fourth PRACH preamble 810. The bundled size of a bundled PRACH transmission 812 occasion (e.g., N) is 4. Specifically, the bundled PRACH transmission 812 includes a first normal PRACH transmission 814 having an index of 0, a second normal PRACH transmission 816 having an index of 1, a third normal PRACH transmission 818 having an index of 2, and a fourth normal PRACH transmission 820 having an index of 3.

FIG. 8B is a schematic block diagram illustrating an additional embodiment of resource pools for transmission beam indicating. A 10 ms frame 822 is illustrated having a system bandwidth 824. The frame 822 includes 1 ms subframes 826, 828, 830, 832, 834, 836, 838, 840, 842, and 844. The frame 822 includes a resource pool of normal PRACH transmission resource occasions 846, 848, 850, 852, 854, 856, 858, 860, 862, and 864, and a resource pool of bundled PRACH transmission resource occasions 866 and 868.

FIG. 8C is a schematic block diagram illustrating an additional embodiment of communications 870 for transmission beam indicating. In this embodiment, the UE 402 does not have TX/RX reciprocity. Moreover, the UE 402 has 2 TX beams (e.g., B0, B1) in UL which the UE 402 may use to transmit PRACH preambles to initialize UL access. The UE 402 may obtain a configuration of a resource pool of normal PRACH transmission occasions and a resource pool of bundled PRACH transmission occasions after decoding broadcast system information.

In this embodiment, the number of TX beams of the UE 402 is smaller than the bundled size of the bundled PRACH transmission 812 occasion. Therefore, the UE 402 may select a normal PRACH transmission occasion from the resource pool of normal PRACH transmission occasions. The UE 402 transmits a normal PRACH transmission 872 in which four PRACH preambles are transmitted using TX beam B0. Thus, the PRACH preambles are transmitted 4 times in the normal PRACH transmission occasion 872 by using the same TX beam.

The gNB 404 may receive a normal PRACH transmission 874 and perform a RX beam sweeping to detect PRACH preambles, but the gNB 404 may not detect any PRACH preambles in the normal PRACH transmission 874 occasion (e.g., because of bad link budget of the UE 402 TX beam).

After the UE 402 does not receive a corresponding RAR in an RAR window 878, the UE 402 may select another normal PRACH transmission occasion from the resource pool of normal PRACH transmission occasions. The UE 402 transmits a normal PRACH transmission 880 in which four PRACH preambles are transmitted using TX beam B1. Thus, the PRACH preambles are transmitted 4 times in the normal PRACH transmission occasion 880 by using the same TX beam.

The gNB 404 may detect two PRACH transmissions successfully of a received normal PRACH transmission 882. Specifically, the gNB 404 may successfully detect, by doing RX beam sweeping, a 2 PRACH preamble of the normal PRACH transmission 882 occasion using RX beam B1 having an index of 1 in the normal PRACH transmission 882 and a fourth PRACH preamble of the normal PRACH transmission 882 occasion using RX beam B3 having an index of 3 in the normal PRACH transmission 882. The gNB 404 may transmit a RAR 886 that implicitly indicates to the UE 402 that TX B1 is the best TX beam out of the 2 TX beams because the RAR 886 is transmitted. The UE 402 may detect the RAR 886 in a RAR window 888 and determine that the TX B1 is the best TX beam to transmit in UL. Therefore, the UE 402 may use TX B1 to transmit message3 890 to the gNB 404. The gNB 404 may receive the message3 890 using RX B1 which is the beam on which the gNB 404 best received the PRACH preamble.

Figure 9:
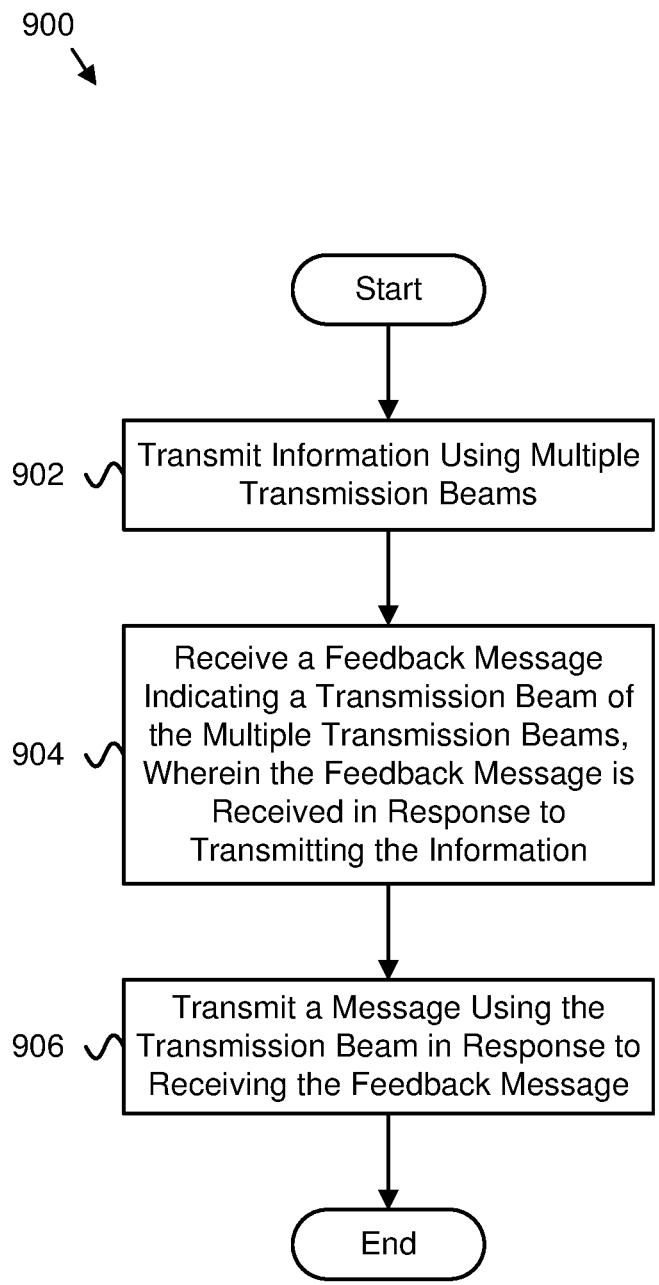
FIG. 9 is a schematic flow chart diagram illustrating one embodiment of a method for transmission beam indicating.

FIG. 9 is a schematic flow chart diagram illustrating one embodiment of a method 900 for transmission beam indicating. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include transmitting 902 information using multiple transmission beams. The method 900 also includes receiving 904 a feedback message indicating a transmission beam of the multiple transmission beams. In certain embodiments, the feedback message is received in response to transmitting the information. In one embodiment, the method 900 includes transmitting 906 a message using the transmission beam in response to receiving the feedback message.

In one embodiment, the information includes one or more physical random access channel preambles. In a further embodiment, the method 900 includes receiving a resource pool for transmitting the information. In certain embodiments, the method 900 includes transmitting the information using a selected one or more resources of the resource pool. In some embodiments, the resource pool includes resources for bundled physical random access channel transmissions.

In various embodiments, the resource pool includes a first resource pool having a first set of resources for normal physical random access channel transmissions and a second resource pool having a second set of resources for bundled physical random access channel transmissions. In some embodiments, the bundled physical random access channel transmissions each include multiple normal physical random access channel transmissions. In one embodiment, the feedback message includes a random access response. In a further embodiment, the feedback message includes an indication that indicates the transmission beam. In various embodiments, the message includes a message 3 of a random access channel procedure.

In some embodiments, the feedback message is generated by a base unit in response to: the base unit detecting one or more normal physical random access channel transmissions in a bundled physical random access channel transmission; and the base unit determining a strongest transmission of the one or more normal physical random access channel transmissions. In one embodiment, the feedback message includes an index corresponding to the strongest transmission of the one or more normal physical random access channel transmissions. In a further embodiment, the index corresponding to the strongest transmission of the one or more normal physical random access channel transmissions is associated with an index corresponding to the transmission beam.

Figure 10:
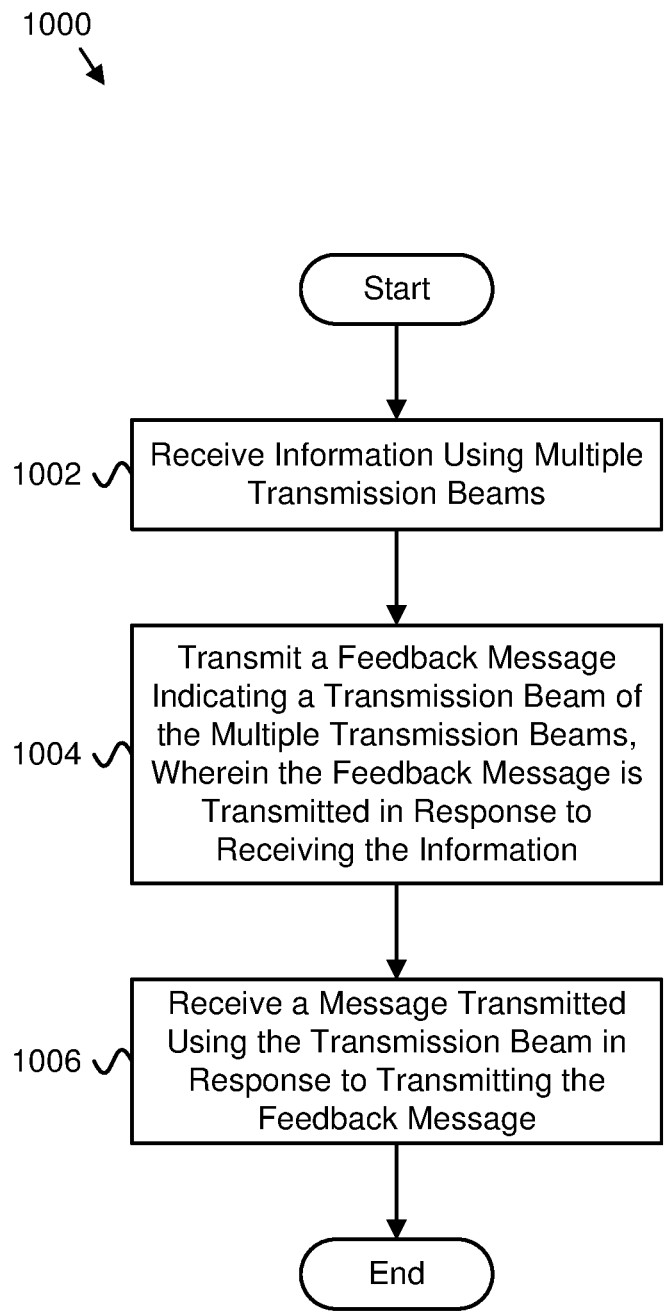
FIG. 10 is a schematic flow chart diagram illustrating another embodiment of a method for transmission beam indicating.

FIG. 10 is a schematic flow chart diagram illustrating one embodiment of a method 1000 for transmission beam indicating. In some embodiments, the method 1000 is performed by an apparatus, such as the base unit 104. In certain embodiments, the method 1000 may be performed by a processor executing program code, for example, a microcontroller, a microprocessor, a CPU, a GPU, an auxiliary processing unit, a FPGA, or the like.

The method 1000 may include receiving 1002 information transmitted using multiple transmission beams. The method 1000 also includes transmitting 1004 a feedback message indicating a transmission beam of the multiple transmission beams. In certain embodiments, the feedback message is transmitted in response to receiving the information. The method 1000 includes receiving 1006 a message transmitted using the transmission beam in response to transmitting the feedback message.

In one embodiment, the information includes one or more physical random access channel preambles. In a further embodiment, the method 1000 includes transmitting a resource pool for communicating the information. In certain embodiments, the method 1000 includes receiving the information using a selected one or more resources of the resource pool. In some embodiments, the resource pool includes resources for bundled physical random access channel transmissions.

In various embodiments, the resource pool includes a first resource pool having a first set of resources for normal physical random access channel transmissions and a second resource pool having a second set of resources for bundled physical random access channel transmissions. In some embodiments, the bundled physical random access channel transmissions each include multiple normal physical random access channel transmissions. In one embodiment, the feedback message includes a random access response. In a further embodiment, the feedback message includes an indication that indicates the transmission beam. In various embodiments, the message includes a message 3 of a random access channel procedure.

In some embodiments, the feedback message is generated by a processor in response to: the apparatus detecting one or more normal physical random access channel transmissions in a bundled physical random access channel transmission; and the apparatus determining a strongest transmission of the one or more normal physical random access channel transmissions. In one embodiment, the feedback message includes an index corresponding to the strongest transmission of the one or more normal physical random access channel transmissions. In a further embodiment, the index corresponding to the strongest transmission of the one or more normal physical random access channel transmissions is associated with an index corresponding to the transmission beam.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
   at least one memory; and
   at least one processor coupled with the at least one memory and configured to cause the UE to:
   receive information indicating a set of bundled physical random access channel (PRACH) transmission occasions, wherein each bundled PRACH transmission corresponding to the set of bundled PRACH transmission occasions comprises multiple PRACH transmission occasions of the set of bundled PRACH transmission occasions;
   transmit at least one bundled PRACH transmission occasion of the set of bundled PRACH transmission occasions using a plurality of transmission beams for the at least one bundled PRACH transmission occasion, wherein each transmission beam of the plurality of transmission beams is different;
   receive a feedback message corresponding to the at least one bundled PRACH transmission occasion, wherein the feedback message indicates a transmission beam of the plurality of transmission beams, the feedback message is received in response to transmitting at least one bundled PRACH transmission occasion; and
   transmit a PRACH message 3 using the transmission beam in response to receiving the feedback message.

2. The UE of claim 1, wherein the feedback message is generated by a base station in response to:
   the base station detecting one or more PRACH transmission occasions in a bundled PRACH transmission occasion of the at least one bundled PRACH transmission occasion; and
   the base station determining a transmission occasion of the one or more PRACH transmission occasions of the bundled PRACH transmission occasion.

3. The UE of claim 2, wherein the feedback message comprises an index corresponding to the transmission occasion of the one or more PRACH transmission occasions.

4. The UE of claim 3, wherein the index corresponding to the transmission occasion of the one or more PRACH transmissions of the bundled PRACH transmission occasion is associated with an index corresponding to one transmission beam of the plurality of transmission beams.

5. The UE of claim 1, wherein the feedback message comprises a random access response.

6. The UE of claim 1, wherein the feedback message comprises an indication that indicates the transmission beam.

7. A method performed by a user equipment (UE), the method comprising:
   receiving information indicating a set of bundled physical random access channel (PRACH) transmission occasions, wherein each bundled PRACH transmission corresponding to the set of bundled PRACH transmission occasions comprises multiple PRACH transmission occasions of the set of bundled PRACH transmission occasions;
   transmitting at least one bundled PRACH transmission occasion of the set of bundled PRACH transmission occasions using a plurality of transmission beams for the at least one bundled PRACH transmission occasion, wherein each transmission beam of the plurality of transmission beams is different;
   receiving a feedback message corresponding to the at least one bundled PRACH transmission occasion, wherein the feedback message indicates a transmission beam of the plurality of transmission beams, and the feedback message is received in response to transmitting at least one bundled PRACH transmission occasion; and
   transmitting a PRACH message 3 using the transmission beam in response to receiving the feedback message.

8. The method of claim 7, wherein the feedback message is generated by a base station in response to:
   the base station detecting one or more PRACH transmission occasions in a bundled PRACH transmission occasion of the at least one bundled PRACH transmission occasion; and
   the base station determining a transmission occasion of the one or more PRACH transmission occasions of the bundled PRACH transmission occasion.

9. The method of claim 8, wherein the feedback message comprises an index corresponding to the transmission occasion of the one or more PRACH transmission occasions.

10. The method of claim 9, wherein the index corresponding to the transmission occasion of the one or more PRACH transmissions of the bundled PRACH transmission occasion is associated with an index corresponding to one transmission beam of the plurality of transmission beams.

11. The method of claim 7, wherein the feedback message comprises a random access response.

12. The method of claim 7, wherein the feedback message comprises an indication that indicates the transmission beam.

13. A base station, comprising:
at least one memory; and
at least one processor coupled with the at least one memory and configured to cause the base station to:
transmit information indicating a set of bundled physical random access channel (PRACH) transmission occasions, wherein each bundled PRACH transmission corresponding to the set of bundled PRACH transmission occasions comprises multiple PRACH transmission occasions of the set of bundled PRACH transmission occasions; and
receive at least one bundled PRACH transmission occasion of the set of bundled PRACH transmission occasions using a plurality of transmission beams for the at least one bundled PRACH transmission occasion, wherein each transmission beam of the plurality of transmission beams is different;
transmit a feedback message corresponding to the at least one bundled PRACH transmission occasion, wherein the feedback message indicates a transmission beam of the plurality of transmission beams, and the feedback message is transmitted in response to receiving at least one bundled PRACH transmission occasion; and
receive a PRACH message 3 using the transmission beam in response to receiving the feedback message.

14. The base station of claim 13, wherein the feedback message is generated in response to:
detecting one or more PRACH transmission occasions in a bundled PRACH transmission occasion of the at least one bundled PRACH transmission occasion; and
determining a transmission occasion of the one or more PRACH transmission occasions of the bundled PRACH transmission occasion.

15. The base station of claim 14, wherein the feedback message comprises an index corresponding to the transmission occasion of the one or more PRACH transmission occasions.

16. The base station of claim 15, wherein the index corresponding to the transmission occasion of the one or more PRACH transmissions of the bundled PRACH transmission occasion is associated with an index corresponding to one transmission beam of the plurality of transmission beams.

17. The base station of claim 13, wherein the feedback message comprises a random access response.

18. The base station of claim 13, wherein the feedback message comprises an indication that indicates the transmission beam.

19. A processor for wireless communication, comprising:
at least one controller coupled with at least one memory and configured to cause the processor to:
receive information indicating a set of bundled physical random access channel (PRACH) transmission occasions, wherein each bundled PRACH transmission corresponding to the set of bundled PRACH transmission occasions comprises multiple PRACH transmission occasions of the set of bundled PRACH transmission occasions;
transmit at least one bundled PRACH transmission occasion of the set of bundled PRACH transmission occasions using a plurality of transmission beams for the at least one bundled PRACH transmission occasion, wherein each transmission beam of the plurality of transmission beams is different;
receive a feedback message corresponding to the at least one bundled PRACH transmission occasion, wherein the feedback message indicates a transmission beam of the plurality of transmission beams, the feedback message is received in response to transmitting at least one bundled PRACH transmission occasion; and
transmit a PRACH message 3 using the transmission beam in response to receiving the feedback message.

20. The processor of claim 19, wherein the feedback message is generated by a base station in response to:
the base station detecting one or more PRACH transmission occasions in a bundled PRACH transmission occasion of the at least one bundled PRACH transmission occasion; and
the base station determining a transmission occasion of the one or more PRACH transmission occasions of the bundled PRACH transmission occasion.

* * * * *